(12) United States Patent
Buell et al.

(10) Patent No.: US 8,035,305 B2
(45) Date of Patent: Oct. 11, 2011

(54) ALTERNATING HEADLIGHTS AND METHOD OF OPERATING

(75) Inventors: Erik F. Buell, Mukwonago, WI (US); Nancy Kardos, Burlington, WI (US); Anthony Stefanelli, Elkhorn, WI (US); Michael R. Medina, Brookfield, WI (US); Steven W. Osgood, Cambellsport, WI (US)

(73) Assignee: Buell Motorcycle Company, East Troy, WI (US)

( * ) Notice: Subject to any disclaimer, the term of this patent is extended or adjusted under 35 U.S.C. 154(b) by 308 days.

(21) Appl. No.: 12/338,646

(22) Filed: Dec. 18, 2008

(65) Prior Publication Data

US 2009/0160343 A1 Jun. 25, 2009

Related U.S. Application Data

(60) Provisional application No. 61/015,034, filed on Dec. 19, 2007.

(51) Int. Cl.
*B60Q 1/02* (2006.01)
*F21V 33/00* (2006.01)
(52) U.S. Cl. ............... 315/83; 362/475; 362/544
(58) Field of Classification Search ............ 362/473, 362/475, 543, 544, 211, 212; 315/82, 83, 315/64
See application file for complete search history.

(56) References Cited

U.S. PATENT DOCUMENTS

| | | | |
|---|---|---|---|
| 3,099,400 A | | 7/1963 | Holmes |
| 3,631,441 A | * | 12/1971 | Murphy .................. 315/136 |
| 3,723,721 A | * | 3/1973 | Weber .................... 362/464 |
| 4,105,898 A | | 8/1978 | Farler et al. |
| 4,539,627 A | | 9/1985 | Ogishima |
| 4,890,038 A | * | 12/1989 | Kurozu et al. .............. 315/82 |
| 6,334,701 B2 | | 1/2002 | Kodaira et al. |
| 6,390,656 B1 | | 5/2002 | Suda et al. |
| 6,439,753 B1 | | 8/2002 | Sumada et al. |
| 6,773,147 B2 | * | 8/2004 | Kakizoe et al. ............ 362/475 |
| 7,674,023 B2 | * | 3/2010 | Ohira ..................... 362/475 |
| 2005/0174788 A1 | | 8/2005 | Hood et al. |
| 2006/0109670 A1 | | 5/2006 | Kitamura et al. |

OTHER PUBLICATIONS

Harley-Davidson Part No. 69804-08, standard equipment on international (non-U.S.) Fat Bob (FXDF) Motorcycles, publicly introduced in Jun. 2007. See attached Fig. A and Statement of Relevance.

* cited by examiner

*Primary Examiner* — John A Ward
(74) *Attorney, Agent, or Firm* — Michael Best & Friedrich LLP

(57) ABSTRACT

A multi-headlight assembly of a motorcycle includes a pair of headlights. A first one of the pair of headlights includes a low power main lamp and a second one of the pair of headlights includes a high power main lamp, the low power main lamp being configured to illuminate in a first operating condition and the high power main lamp being configured to illuminate in a second operating condition. A secondary lamp is associated with one of the pair of headlights and is configured to illuminate when the main lamp of the other one of the pair of headlights is illuminated. The secondary lamp is of a lower power than the low power main lamp.

20 Claims, 5 Drawing Sheets

ALTERNATING HEADLIGHTS AND METHOD OF OPERATING

CROSS-REFERENCE TO RELATED APPLICATIONS

This application claims priority to U.S. Provisional Patent Application No. 61/015,034, filed on Dec. 19, 2007, the entire contents of which are hereby incorporated by reference.

BACKGROUND

The present invention relates to motorcycle headlights. More specifically, the invention relates to operational characteristics of a multi-headlight assembly with switchable high beam and low beam illumination.

SUMMARY

In one embodiment, the invention provides a multi-headlight assembly of a motorcycle including a pair of headlights. A first one of the pair of headlights includes a low power main lamp and a second one of the pair of headlights includes a high power main lamp. The low power main lamp is configured to illuminate in a first operating condition, and the high power main lamp is configured to illuminate in a second operating condition. A secondary lamp is associated with one of the pair of headlights and is configured to illuminate when the main lamp of the other one of the pair of headlights is illuminated. The secondary lamp is of a lower power than the low power main lamp.

In another embodiment, the invention provides a motorcycle including a first headlight and a second headlight. The first headlight includes a low power lamp and a secondary lamp having a lower power than the low power lamp. The second headlight includes a high power lamp and a secondary lamp having a lower power than the low power lamp. A headlight control switch is coupled to both of the first and second headlights, and is configured to switch between a first operating condition and a second operating condition. The low power lamp of the first headlight and the secondary lamp of the second headlight are configured to illuminate in the first operating condition, and the high power lamp of the second headlight and the secondary lamp of the first headlight are configured to illuminate in the second operating condition.

In yet another embodiment, the invention provides a method of operating a multi-headlight assembly of a motorcycle. The method includes providing a first headlight with a low power lamp and a secondary lamp having a lower power than the low power lamp, and providing a second headlight with a high power lamp and a secondary lamp having a lower power than the low power lamp. The low power lamp of the first headlight and the secondary lamp of the second headlight are illuminated during a first operating condition. The high power lamp of the second headlight and the secondary lamp of the first headlight are illuminated during a second operating condition.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
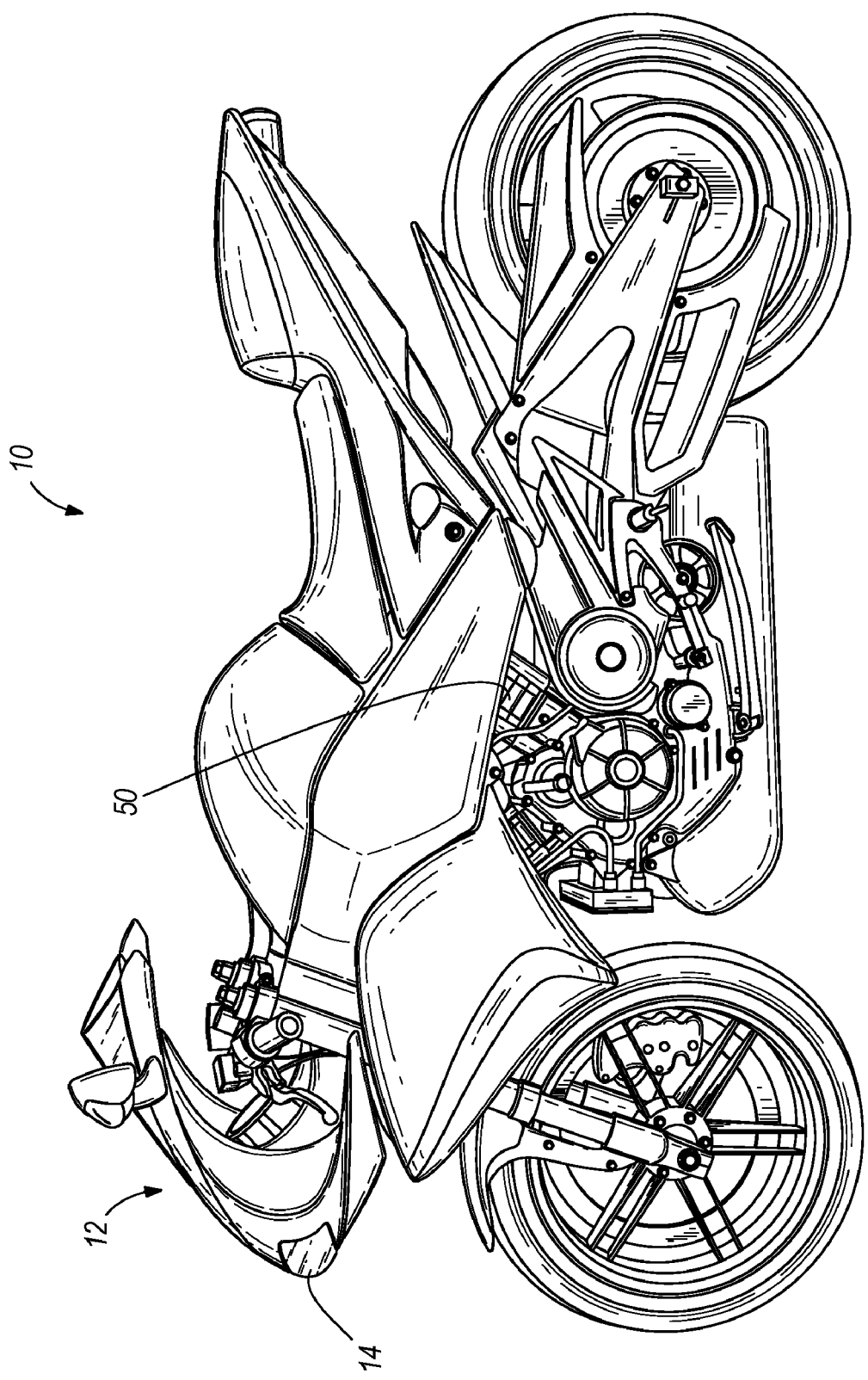
FIG. 1 is a side view of a motorcycle having a multi-headlight assembly and an associated control system of the present invention.
Figure 2:
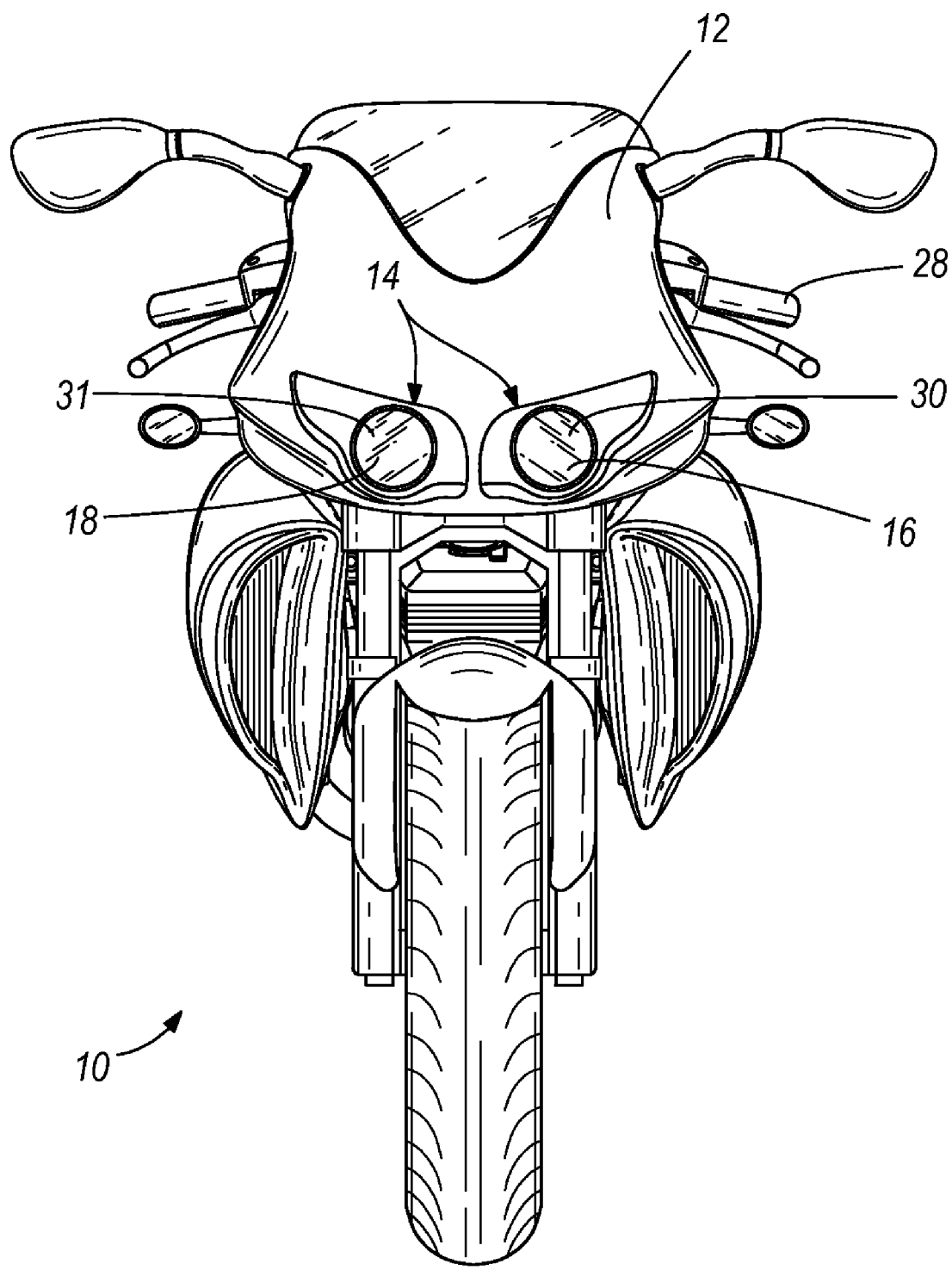
FIG. 2 is a front view of the motorcycle of FIG. 1.

The motorcycle 10 of FIGS. 1 and 2 includes a front fairing assembly 12 housing a multi-headlight assembly 14. The multi-headlight assembly 14 includes two headlights 16, 18. The headlights 16, 18 are arranged horizontally, but other configurations are optional. The headlights 16, 18 provide low beam illumination in one configuration (i.e., a first operating condition) and high beam illumination in a second configuration (i.e., a second operating condition). In low beam operation, the multi-headlight assembly 14 provides a first range of illumination of the motorcycle's path that is relatively concentrated in front of the motorcycle 10 with a distribution and/or intensity that is not distracting to oncoming traffic. In high beam operation, the multi-headlight assembly 14 provides a second range of illumination of the motorcycle's path which is greater than the first range of illumination. The high beam operation of the multi-headlight assembly 14 provides a greater intensity and/or larger illumination area than low beam operation. Generally, high beam operation provides more illumination of the motorcycle's path, but is inappropriate for use with oncoming traffic.

Figure 3:
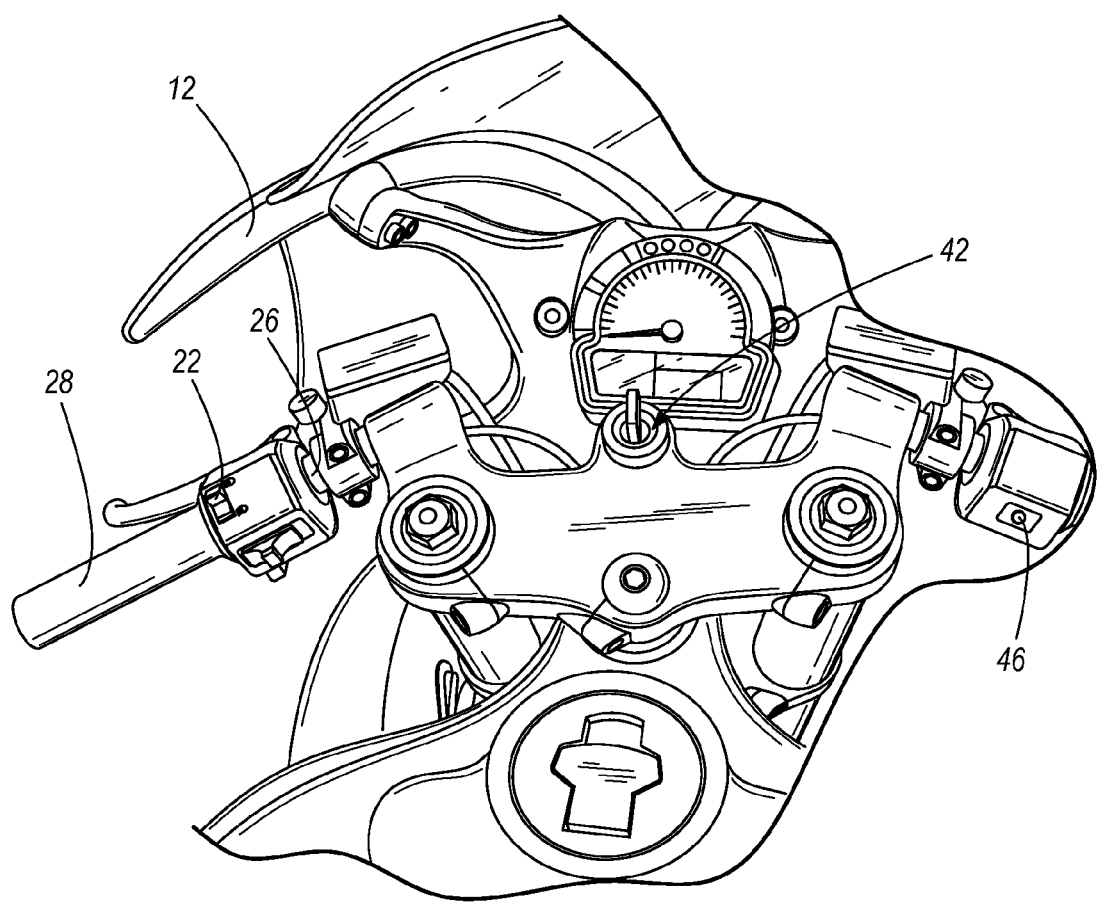
FIG. 3 is a perspective view of an instrument cluster and handlebar area of the motorcycle of FIG. 1.

The motorcycle 10 is provided with a control system 20 (FIG. 4), including a headlight control switch 22, for controlling the operation of the first and second headlights 16, 18 (including switching between high beam illumination and low beam illumination). As shown in FIG. 3, the headlight control switch 22 is located on a handlebar 26 of the motorcycle 10, adjacent a left hand grip 28.

Figure 4:
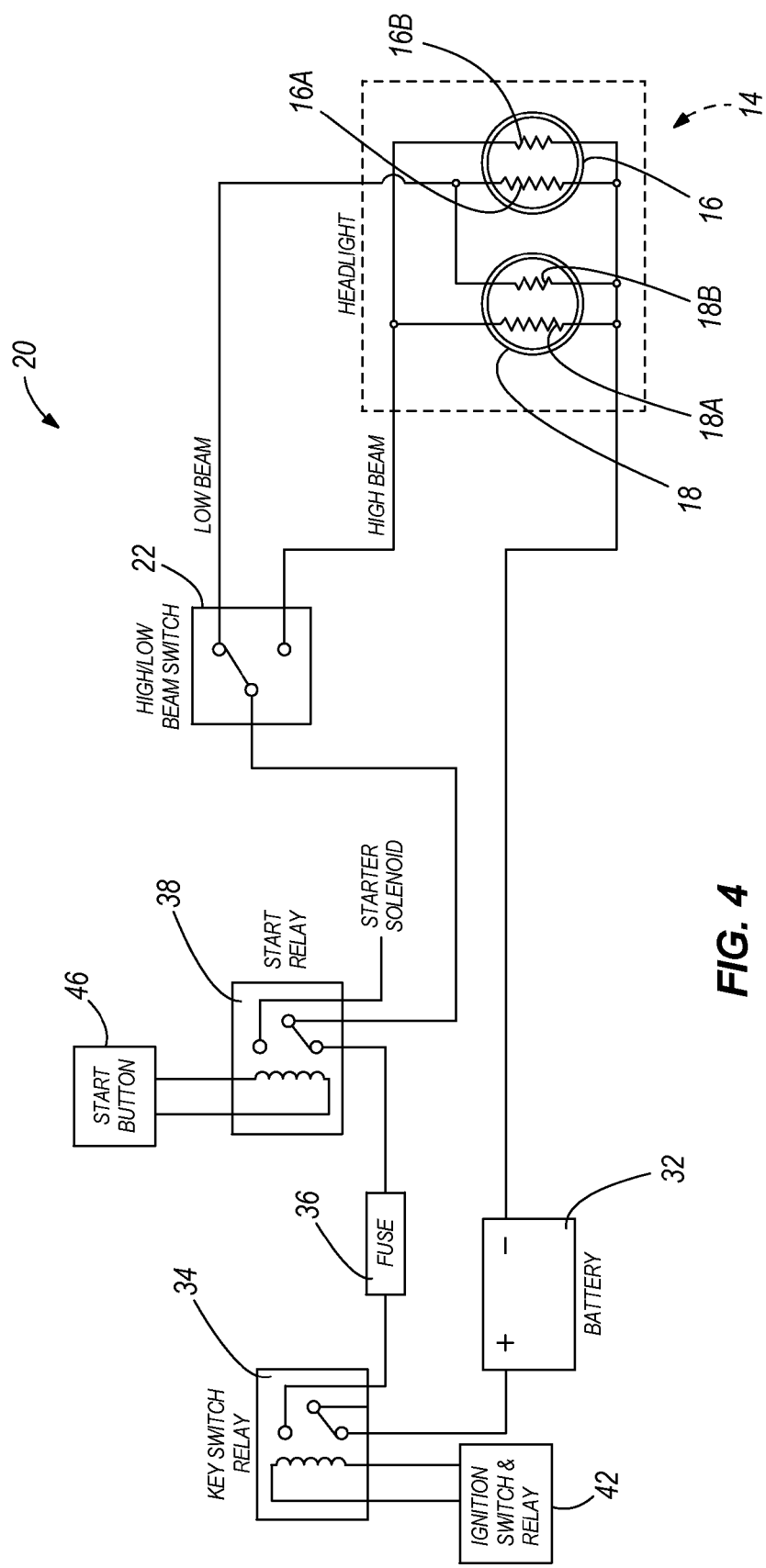
FIG. 4 is a schematic view of the control system for the multi-headlight assembly.

The first headlight 16 includes a main or primary lamp 16A and a secondary lamp 16B (FIG. 4). The primary lamp 16A or "low power lamp" is configured to provide low beam illumination when powered. The secondary lamp 16B has a power less than the low power lamp 16A. For example, the low power lamp 16A can be a 35-watt lamp and the secondary lamp 16B can be a 5-watt lamp. The first headlight 16 is covered by an outer lens 30 (FIG. 2). A reflector unit (not shown) substantially surrounds the lamps 16A, 16B of the first headlight 16 to cast light outward from the first headlight 16 forward of the motorcycle 10.

The second headlight 18 includes a main or primary lamp 18A and a secondary lamp 18B (FIG. 4). The primary lamp 18A or "high power lamp" is configured to provide high beam illumination when powered. The secondary lamp 18B has a power less than the high power lamp 18A and less than the primary lamp 16A of the first headlight 16. For example, the high power lamp 18A can be a 55-watt lamp and the secondary lamp 18B can be a 5-watt lamp, similar to the secondary lamp 16B of the first headlight 16. The second headlight 18 is covered by an outer lens 31 (FIG. 2). A reflector unit (not shown) substantially surrounds the lamps 18A, 18B of the second headlight 18 to cast light outward from the second headlight 18 forward of the motorcycle 10.

As illustrated in at least FIG. 2, the headlights 16, 18 are separate from each other so that light produced within one of the headlights 16, 18 does not illuminate the opposite headlight 16, 18. In this "alternating headlight" configuration, the first headlight 16 is operable to provide low beam illumination, and the second headlight 18 is operable to provide high beam illumination. Prior art alternating headlight configurations, in which opposing headlights are used for high and low beam illumination, leave the non-operating headlight completely dormant. The dormant headlight gives the impression that the headlight is burnt out or disconnected. This can cause confusion with fellow motorists and/or traffic officers, who may signal to or stop the rider to notify him/her of the headlight condition. This becomes a nuisance as the headlight is not malfunctioning, but rather, is operating as part of an alternating headlight configuration.

Although described as being separate from each other, the headlights 16, 18 may be provided in a common housing and/or behind a shared lens. Even in such an embodiment, the headlights 16, 18 are considered separate as they are provided in separate compartments and/or with separate reflector units so that the lamps of one headlight provide substantially no illumination of the opposite headlight (including the reflector unit of the opposite headlight).

As shown in the schematic diagram of FIG. 4, the control system 20 is configured to control the operation of the first and second headlights 16, 18. The first and second headlights 16, 18 are electrically connected to an electrical power source, such as a battery 32, through a key switch relay 34, a fuse 36, and a start relay 38. An ignition switch 42 (shown in FIG. 3) is electrically coupled to the key switch relay 34 to operate the key switch relay 34. The ignition switch 42 is key-operated and movable at least between an "ON" position and an "OFF" position. In the "ON" position, the ignition switch 42 actuates the key switch relay 34 to establish an electrical connection through the key switch relay 34, which electrically couples the battery 32 to the start relay 38. In the "OFF" position, the ignition switch 42 is open so that the key switch relay 34 is not actuated and does not electrically couple the battery 32 and the start relay 38 together.

The control system 20 includes means for selectively disconnecting the first and second headlights 16, 18 from the battery 32 to provide maximum electrical power for starting an engine 50 of the motorcycle 10. The start relay 38 is positioned in series with the key switch relay 34 and configured to selectively break the electrical connection between the battery 32 and the first and second headlights 16, 18 independent of the position of the ignition switch 42 (and the condition of the key switch relay 34) when a start button 46 (shown in FIG. 3) of the motorcycle 10 is pressed. Thus, during starting of the engine 50, the electrical connection between the battery 32 and the first and second headlights 16, 18 is broken by the start relay 38 to limit the voltage drop in the battery 32 due to the first and second headlights 16, 18, which helps to ensure that the engine starting operation is completed.

The headlight control switch 22 is positioned between the start relay 38 and both of the first and second headlights 16, 18. In a first position, a "low beam" position, the headlight control switch 22 establishes an electrical connection between the battery 32 and the low power lamp 16A of the first headlight 16. In the low beam position, an electrical connection is also established between the battery 32 and the secondary lamp 18B of the second headlight 18. With the control switch 22 in the low beam position (as shown in FIG. 4), the low power lamp 16A of the first headlight 16 and the secondary lamp 18B of the second headlight 18 are configured to illuminate.

When switched to a second position, a "high beam" position, the headlight control switch 22 breaks the electrical connection between the battery 32 and the low power lamp 16A of the first headlight 16. The electrical connection between the battery 32 and the secondary lamp 18B of the second headlight 18 is also broken when the headlight control switch 22 is turned to the high beam position. In the high beam position, the headlight control switch 22 establishes an electrical connection between the battery 32 and the high power lamp 18A of the second headlight 18. In the high beam position, the headlight control switch 22 also establishes an electrical connection between the battery 32 and the secondary lamp 16B of the first headlight 16. With the control switch 22 in the high beam position, the high power lamp 18A of the second headlight 18 and the secondary lamp 16B of the first headlight 16 are configured to illuminate.

When the headlight control switch 22 is returned to the low beam position, the high power lamp 18A of the second headlight 18 and the secondary lamp 16B of the first headlight 16 are turned off, and the low power lamp 16A of the first headlight 16 and the secondary lamp 18B of the second headlight 18 are turned on.

Thus, the headlight control switch 22 is configured to change between the first operating condition (low beam illumination) and the second operating condition (high beam illumination) by selectively powering only one of the low power lamp 16A and the high power lamp 18A. Also, as described above, a secondary lamp 16B, 18B is always illuminated in the headlight 16, 18 whose primary lamp 16A, 18A is off. Therefore, there is no operating condition of the multi-headlight assembly 14 in which one of the headlights 16, 18 is illuminated while the opposite headlight 16, 18 is completely off. Even though the secondary lamps 16B, 18B provide substantially no illumination of the motorcycle's path, light produced by one of the secondary lamps 16B, 18B illuminates the respective reflector unit of that particular headlight 16, 18 to prevent the appearance of a burnt out or disconnected headlight, which may draw the attention of fellow motorists or traffic officers.

Figure 5:
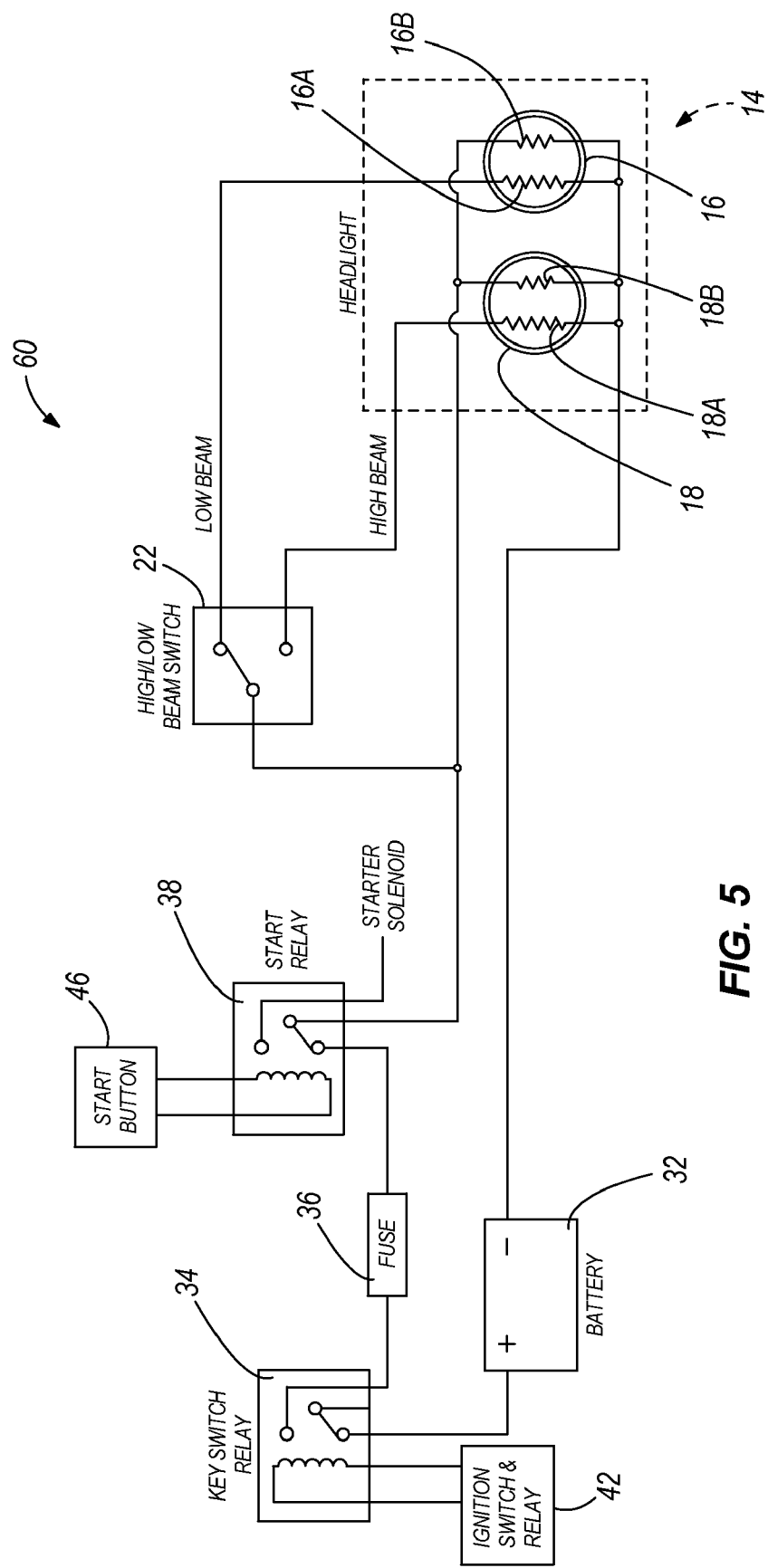
FIG. 5 is a schematic view of an alternate control system for the multi-headlight assembly.

FIG. 5 illustrates an alternate control system 60 for the multi-headlight assembly 14. The alternate control system 60 is similar to the control system 20 illustrated in FIG. 4 and discussed above, except in the particular aspects described below.

Referring to FIG. 5, the headlight control switch 22 is operable to selectively establish an electrical connection between the battery 32 and one of the low power lamp 16A of the first headlight 16 and the high power lamp 18A of the second headlight 18. The switching circuit is configured to switch between low beam operation in a first operating condition (shown in FIG. 5) and high beam operation in a second operating condition while the secondary lamps 16B, 18B of both the first and second headlights 16, 18 remain illuminated. To this effect, the headlight control switch 22 (along with the primary lamps 16A, 18A) are positioned along a secondary circuit while the secondary lamps 16B, 18B are part of a main circuit, which is not opened or closed by the headlight control switch 22. Thus, the circuit is simplified by only switching between the low power lamp 16A and the high power lamp 18A, while the secondary lamps 16B, 18B are not switched on and off when the headlight control switch 22 switches between low beam and high beam operation. Similar to the control system 20 of FIG. 4, the secondary lamp 16B, 18B is illuminated on the headlight 16, 18 whose primary lamp (low power lamp 16A and high power lamp 18A) is off. Contrary to the control system 20 of FIG. 4, the control system 60 of FIG. 5 also illuminates the secondary lamp 16B, 18B of the headlight 16, 18 whose primary lamp 16A, 18A is on.

Thus, the invention provides, among other things, a multi-headlight assembly 14 including two headlights 16, 18, the first headlight 16 having a main lamp 16A providing low beam illumination in a first operating condition. The second headlight 18 includes a main lamp 18A providing high beam illumination in a second operating condition. A secondary lamp 16B, 18B of one of the headlights 16, 18 is illuminated when the main lamp 16A, 18A of the opposite headlight 16, 18 is illuminated. Various features and advantages of the invention are set forth in the following claims.

What is claimed is:

1. A multi-headlight assembly of a motorcycle comprising:
    a first headlight pair including a first main lamp configured to illuminate in a first operating condition to provide low beam illumination;
    a second headlight including a second main lamp configured to illuminate in a second operating condition to provide high beam illumination; and
    a secondary lamp associated with one of the first and second headlights and being configured to illuminate when the main lamp of the headlight having the secondary lamp is off, the secondary lamp illuminating the headlight having the secondary lamp without providing any substantial contribution to the low beam illumination or the high beam illumination.

2. The multi-headlight assembly of claim 1, wherein the first headlight is configured to provide a first range of illumination in front of the motorcycle in the first operating condition, and the second headlight is configured to provide a second range of illumination in front of the motorcycle in the second operating condition, the second range of illumination being greater than the first range of illumination.

3. The multi-headlight assembly of claim 1, wherein the first main lamp has a power of between about 25 Watts and about 45 Watts, and the second main lamp has a power of between about 45 Watts and about 65 Watts.

4. The multi-headlight assembly of claim 3, wherein the first main lamp has a power of about 35 Watts, and the second main lamp has a power of about 55 Watts.

5. The multi-headlight assembly of claim 1, wherein the first main lamp has a power less than a power of the second main lamp.

6. The multi-headlight assembly of claim 1, wherein the secondary lamp has a power of between about 2 Watts and about 15 Watts.

7. The multi-headlight assembly of claim 6, wherein the secondary lamp has a power of about 5 Watts.

8. The multi-headlight assembly of claim 1, wherein each of the first and second of headlights includes a secondary lamp, the secondary lamp of the first headlight being configured to illuminate in the second operating condition, and the secondary lamp of the second headlight being configured to illuminate in the first operating condition.

9. The multi-headlight assembly of claim 8, wherein the secondary lamps of both of the first and second headlights are configured to illuminate during both of the first and second operating conditions.

10. The multi-headlight assembly of claim 1, wherein low beam illumination is provided by the first main lamp alone, and the secondary lamp is associated with the second headlight to illuminate the second headlight during the first operating condition when the second main lamp is off.

11. A motorcycle comprising:
    a first headlight including a main lamp and a secondary lamp having a lower power than the main lamp, the first headlight being configured to provide low beam illumination;
    a second headlight including a main lamp and a secondary lamp, the secondary lamp having a lower power than the main lamp of the first headlight, the second headlight being configured to provide high beam illumination; and
    a headlight control switch coupled to both of the first and second headlights, the headlight control switch being configured to switch between a first operating condition and second operating condition,
    wherein the main lamp of the first headlight and the secondary lamp of the second headlight are configured to illuminate in the first operating condition, and the main lamp of the second headlight and the secondary lamp of the first headlight are configured to illuminate in the second operating condition.

12. The motorcycle of claim 11, wherein the secondary lamps provide substantially no illumination of the motorcycle's path.

13. The motorcycle of claim 11, wherein the main lamp of the first headlight has a power of between about 25 Watts and about 45 Watts, and the main lamp of the second headlight has a power of between about 45 Watts and about 65 Watts.

14. The motorcycle of claim 11, wherein the main lamp of the first headlight has a power less than a power of the main lamp of the second headlight.

15. The motorcycle of claim 11, wherein the secondary lamps of the first and second headlights have a power of between about 2 Watts and about 15 Watts.

16. The motorcycle of claim 11, wherein the secondary lamps of both of the first and second headlights are configured to illuminate during both of the first and second operating conditions.

17. A method of operating a multi-headlight assembly of a motorcycle, the method comprising:
    providing a first headlight with a main lamp and a secondary lamp having a lower power than the main lamp;
    providing a second headlight with a main lamp and a secondary lamp having a lower power than the main lamps of both headlights;
    illuminating the main lamp of the first headlight and the secondary lamp of the second headlight during a first operating condition; and
    illuminating the main lamp of the second headlight and the secondary lamp of the first headlight during a second operating condition.

18. The method of claim 17, further comprising providing a first range of illumination in front of the motorcycle in the first operating condition and providing a second range of illumination in front of the motorcycle in the second operating condition, the second range of illumination being greater than the first range of illumination, wherein the secondary lamps of the first and second headlights have substantially no impact on the first or second ranges of illumination.

19. The method of claim 17, further comprising switching from the first operating condition to the second operating condition including switching off the main lamp of the first headlight, switching on the main lamp of the second headlight, switching on the secondary lamp of the first headlight, and switching off the secondary lamp of the second headlight.

20. The method of claim 17, further comprising using more power to operate the main lamp of the second headlight in the second operating condition than the power to operate the main lamp of the first headlight in the first operating condition.

* * * * *

UNITED STATES PATENT AND TRADEMARK OFFICE
CERTIFICATE OF CORRECTION

| | |
|---|---|
| PATENT NO. | : 8,035,305 B2 |
| APPLICATION NO. | : 12/338646 |
| DATED | : October 11, 2011 |
| INVENTOR(S) | : Erik F. Buell |

It is certified that error appears in the above-identified patent and that said Letters Patent is hereby corrected as shown below:

In claim 1, column 5, line 30, The word "pair" should be removed.
In claim 8, column 5, line 66, The word "of" between "second" and "headlights" should be removed.

Signed and Sealed this
Twenty-fourth Day of April, 2012

David J. Kappos
*Director of the United States Patent and Trademark Office*